JOHN Y. BETTS, OF COVENTRY, ENGLAND, ASSIGNOR TO FREDERICK W. BETTS, OF NEW YORK CITY.

Letters Patent No. 87,390, dated March 2, 1869; patented in England, April 20, 1865.

IMPROVEMENT IN ADMISSION OF STEAM TO BAKING-OVENS.

The Schedule referred to in these Letters Patent and making part of the same.

*To all whom it may concern:*

Be it known that I, JOHN Y. BETTS, of Coventry, England, have invented new and useful Improvements in the Process of Baking Bread; and I do hereby declare that the following is a full, clear, and exact description thereof, which will enable others skilled in the art to understand the same.

This invention relates to an improvement in the process of baking, whereby it is designed that the quality of the bread and other farinaceous articles shall be greatly improved, the chemical change set up in the dough by the heat of the oven being more thorough throughout the loaf than usual, and from which there result an economy to the manufacturer, and lighter and more wholesome bread, (with an improved appearance,) than is ordinarily obtained.

My improvement consists in the method of introducing steam into the ordinary or any approved oven, charged with the dough to be baked, and heated in any well-known or approved way.

The steam will be supplied in any convenient manner, and discharged into the oven, in horizontal jets, from perforated pipes, or in any manner that will thoroughly diffuse it in a stratum above the dough, or near the top of the oven.

I keep the oven charged with an atmosphere of steam for a part of the time that the charge of bread, biscuits, or other articles, is submitted to the heat of the oven, but, before the oven is drawn, cut off the supply of steam.

The heat of the oven will superheat the steam admitted thereto, and, the more effectually to insure this result, I may coil the steam-supply pipe, or give it a turn or two around inside the oven.

The steam admitted to the oven serves to keep the pores of the dough open, and allow the heat effectually to penetrate the mass.

The steam may be introduced either immediately before or simultaneously with the charge of dough being put into the oven, one object of the invention being to intercept the radiation of too great a heat from the roof of the oven, and to equalize the heat therein. By so doing, the formation of crust is retarded until the heat has had time to penetrate to and act upon the centre of the loaf.

The steam may be retained in the oven a greater or less period of time, as found best.

It is important that the steam should be supplied by means of a pipe or pipes placed above the dough or near the roof of the oven.

These steam-pipes are to be perforated laterally on each side, so as to supply the steam in horizontal jets above the articles to be baked, and thus prevent its being blown directly on to them.

The steam, without soddening the dough, will thus be enabled to modify the ordinary dry heat, which otherwise attacks the outer portion of the dough, and immediately forms a crust, which, to a considerable degree, prevents the expansion of the same.

Bread baked by my process retains a more considerable degree of moisture, and consequently has more weight.

It is partly in consequence of the retention of moisture that it is more palatable.

It presents a glossy external appearance, and the crust is, as a rule, thinner than that of bread baked in the ordinary way.

Having thus described my invention,

What I claim as new, and desire to secure by Letters Patent, is—

The herein-described process for baking, consisting in the discharge into the oven, while containing the dough, of horizontal jets of steam above the dough, in the manner and for the purpose substantially as set forth.

The annexed specification of my invention signed by me, this 23d day of May, 1868.

JOHN Y. BETTS.

Witnesses:
ELIHU BURRITT,
J. BRAMS.